United States Patent [19]

Fargeout

[11] Patent Number: 5,732,749
[45] Date of Patent: Mar. 31, 1998

[54] PIN SEAM FOR LAMINATED INTEGRALLY WOVEN PAPERMAKER'S FABRIC

[75] Inventor: Patrick Fargeout, Riberac, France

[73] Assignee: Albany International Corp., Albany, N.Y.

[21] Appl. No.: 800,770

[22] Filed: Feb. 14, 1997

[51] Int. Cl.⁶ .................. D03D 13/00; B32B 5/02
[52] U.S. Cl. .................. 139/383 AA; 442/205; 442/247; 442/301; 139/383 A
[58] Field of Search ................ 442/235, 301, 442/206, 270, 205, 247; 139/383 AA, 383 A

[56] References Cited

U.S. PATENT DOCUMENTS

| | | | |
|---|---|---|---|
| 3,815,645 | 6/1974 | Codorniu | 139/383 A |
| 4,103,717 | 8/1978 | Clark | 139/383 AA |
| 4,186,780 | 2/1980 | Josef et al. | 139/383 AA |
| 4,537,816 | 8/1985 | Booth et al. | 139/383 AA |
| 4,574,435 | 3/1986 | Luciano et al. | 139/383 AA |
| 4,896,702 | 1/1990 | Crook | 139/383 AA |
| 4,958,673 | 9/1990 | Dufour | 139/383 AA |
| 5,204,150 | 4/1993 | Davenport | 139/383 AA |
| 5,466,339 | 11/1995 | Legge | 139/383 AA |
| 5,503,196 | 4/1996 | Josef et al. | 139/383 AA |
| 5,601,877 | 2/1997 | Miller et al. | 139/383 AA |

FOREIGN PATENT DOCUMENTS 2 060 016   4/1981   United Kingdom ............ 139/383 AA

*Primary Examiner*—Andy Falik
*Attorney, Agent, or Firm*—Kane, Dalsimer, Sullivan, Kurucz, Levy, Eisele and Richard, LLP

[57] ABSTRACT

A laminated integrally woven on-machine-seamable papermaker's fabric includes two single-layer woven fabric plies sharing a common machine-direction (MD) yarn. The common MD yarn, which is the weft yarn on the loom during the weaving of the fabric by a modified endless weaving technique, forms seaming loops which join the plies to one another at the ends thereof. The fabric may be needled with a batt of staple fiber material. During the weaving of the press fabric, solvent-removable binder yarns join the two plies, which are accordingly integrally woven. When the weaving is completed, the solvent-removable binder yarns are removed through dissolution with an appropriate solvent, yielding the laminated structure. A batt of staple fiber material may be needled into and through the laminated structure. The papermaker's fabric may be used as a forming, press or dryer fabric, or as a base for a polymer-coated, paper industry process belt, such as a long nip press, sheet-transfer or calender belt.

32 Claims, 5 Drawing Sheets

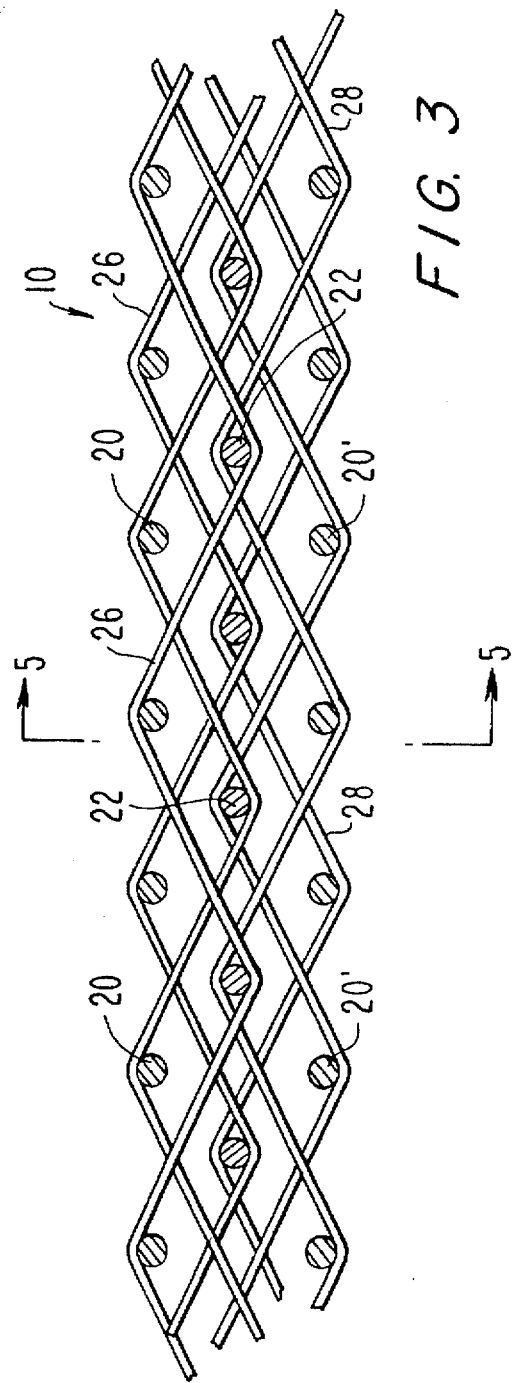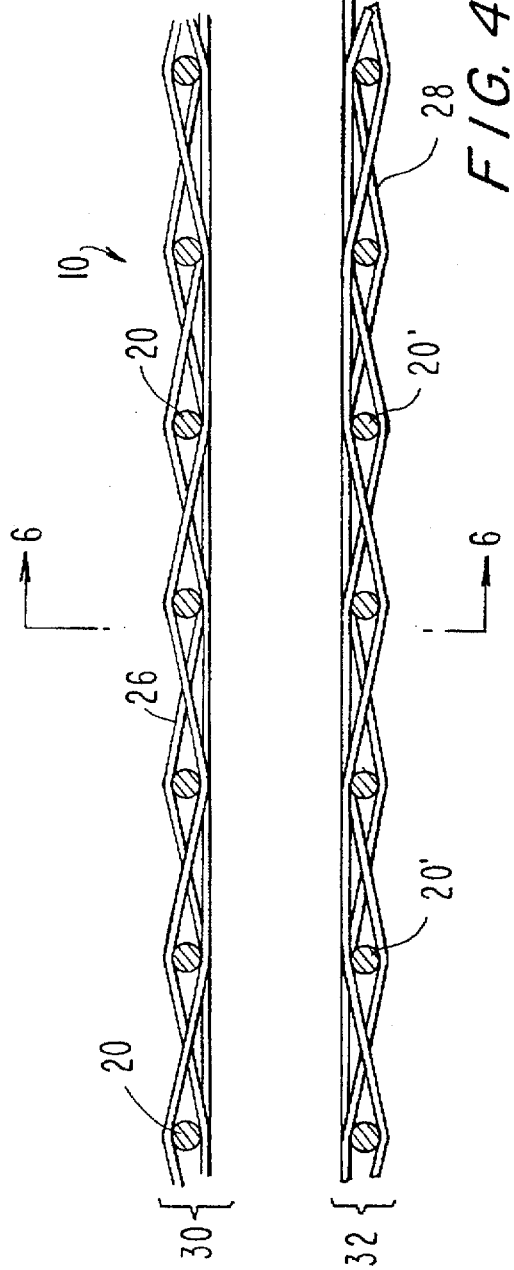

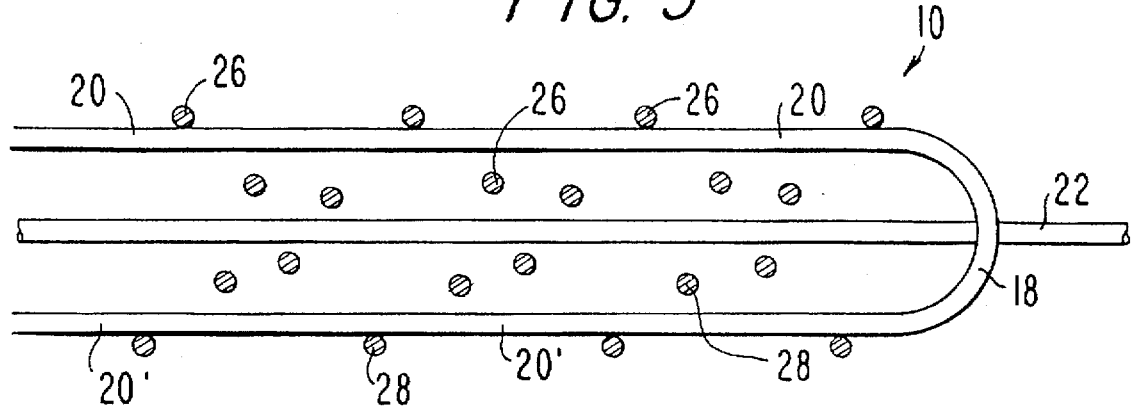
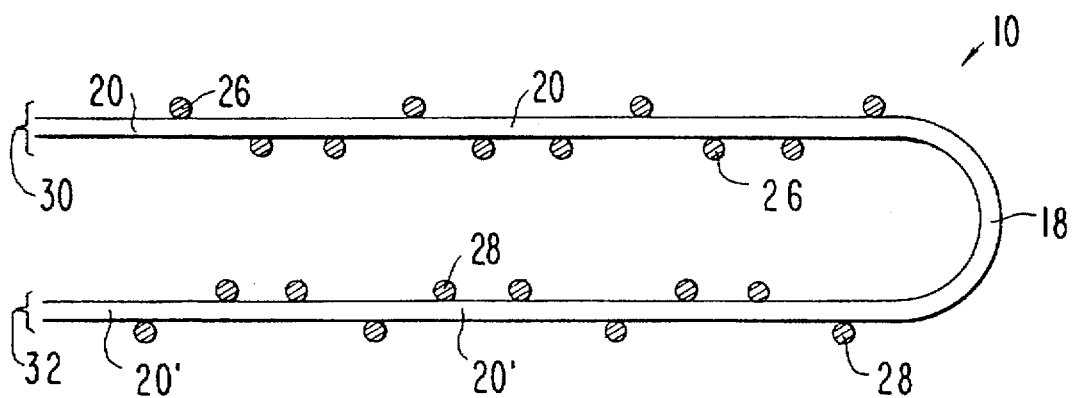

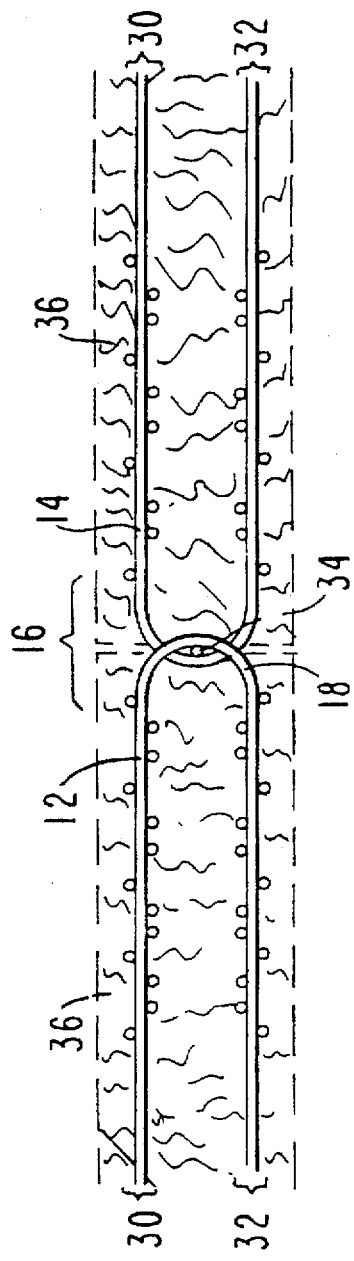
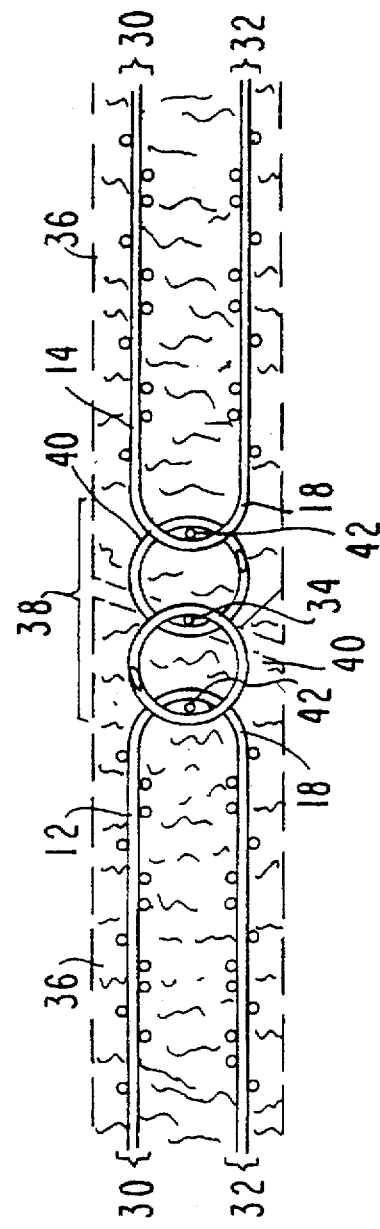

5,732,749

PIN SEAM FOR LAMINATED INTEGRALLY WOVEN PAPERMAKER'S FABRIC

BACKGROUND OF THE INVENTION

1. Field of the Invention

The present invention relates to the papermaking arts. More specifically, the present invention is both a papermaker's fabric for use in the press section of the papermachine, such a fabric being commonly referred to as a press fabric, as well as for use on other sections of a papermachine and in other paper-manufacturing applications, and a method for manufacturing such a fabric. In particular, the papermaker's fabric is of the OMS® (on-machine-seamable) variety and has a multiple layer laminated base.

2. Description of the Prior Art

During the papermaking process, a fibrous web is formed by depositing a fibrous slurry, that is, an aqueous dispersion of cellulose fibers, on a moving forming fabric in the forming section of a papermachine. A large amount of water is drained from the slurry through the forming fabric during this process, leaving the fibrous web on the surface of the forming fabric.

The newly formed cellulosic fiber web proceeds from the forming section to a press section, which includes a series of press nips. The cellulosic fiber web passes through the press nips supported by a press fabric, or, as is often the case, between two such press fabrics. In the press nips, the cellulosic fiber web is subjected to compressive forces which squeeze water therefrom, and which adhere the fibers in the web to one another to transform the cellulosic fiber web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The web, or newly formed paper sheet, itself is directed in a sinuous path sequentially around each in the series of drums by a dryer fabric, which holds the web closely against the surfaces of the drums. The heated drums reduce the water content of the web to a desirable level through evaporation.

It should be appreciated that the forming, press and dryer fabrics all take the form of an endless loop and function in the manner of conveyors. It should further be appreciated that paper manufacture is a continuous process which proceeds at considerable speed. That is to say, the fibrous slurry is continuously deposited onto the forming fabric in the forming section, while a newly manufactured paper sheet is continuously wound onto rolls after it exits from the dryer section.

The press fabrics used to clothe the press section are crucial components in the paper manufacturing process. One of their functions is to support and to carry the paper product being manufactured through the press nips. In this respect, the fabric serves as a conveyor belt during the manufacturing process.

The press fabric also take part in the finishing of the surface of the paper sheet. That is, the surface of the press fabric is designed to be smooth and uniformly resilient, so that, in the course of passing through the press nips, a smooth, mark-free surface is imparted to the paper.

Perhaps most importantly, the press fabrics accept the a large quantities of water extracted from the wet paper sheet in the press nip. In order to fulfill this function, there literally must be somewhere in the fabric for the water to go (void volume), and the fabric must maintain an adequate permeability to water and an acceptable openness and void volume for its entire useful life.

Contemporary press fabrics are available in a wide variety of styles designed to meet the requirements of the papermachines on which they are installed for the paper grades being manufactured. Generally, they comprise a woven base fabric into which has been needled a batt of fine, nonwoven fibrous material. The base fabrics may be woven from monofilament, plied monofilament, multifilament or plied multifilament yarns, and may be single layered, multi-layered, multi-plied or laminated. The yarns themselves are typically extruded from any one of the synthetic polymeric resins, such as polyamide and polyester resins, used for this purpose by those of ordinary skill in the papermachine clothing arts.

In recent years, interest in press fabrics having laminated base fabrics has been on the increase. Base fabrics of this type comprise two or more fabric layers, with one or more endless inner layers being disposed within an endless outer layer, the inner and outer layers being joined to one another by the fibrous material of the batt needled therethrough. While laminated base fabrics permit the use of a variety of weave patterns in the individual base fabric layers, and yield a smoother press fabric with increased void volume, it is difficult to manufacture base fabric layers which are adequately matched dimensionally and in appearance and quality. Further, press fabrics having laminated base fabrics comprising two or more fabric layers are usually stiffer than their integrally woven counterparts due to the increased total number of cross-machine direction (CD) yarns.

The difficulty in producing a press fabric having a laminated base fabric meeting the requirements of smoothness, resilience and adequate void volume is further compounded when one wants to make such a fabric on-machine-seamable.

At one time, it should be recalled, press fabrics were supplied only in endless form. One method used was to weave them in the form of an endless, seamless loop by a process known as endless weaving. In addition, conditions in the press section present additional special requirements that have to be satisfied to utilize a workable seamed press fabric. In brief, these special requirements arise because the seam region must behave under load, that is, under compression in the press nip or nips, like the rest of the press fabric, and because the seam region must have the same permeability to water and to air as the rest of the press fabric, in order to avoid periodic marking of the paper product being manufactured by the seam region.

Despite these considerable obstacles, it remained highly desirable to develop an on-machine-seamable press fabric, because of the comparative ease and safety with which it can be installed on the press section. Ultimately, these obstacles were overcome with the development of the OMS® (on-machine-seamable) and SEAMTECH™ products by Albany international. These products include a seam formed by providing seaming loops at the opposite transverse edges at the two ends of the fabric. The seaming loops themselves are formed by the machine-direction (MD) yarns of the fabric. The pin seam is formed by bringing the two ends of the press fabric together, by interdigitating the seaming loops at the two ends of the fabric, and by directing a so-called pin, or pintle, through the passage defined by the interdigitated seaming loops to lock the two ends of the press fabric together. Needless to say, it is much easier and far less time consuming to install an OMS® press fabric on a papermachine than it is to install an endless press fabric there. OMS® is a registered trademark of Albany International Corp.

One method to produce a press fabric that can be joined on the paper machine with a "pin seam" is to flat-weave the fabric, and then to weave the warp ends back into the fabric in a direction parallel to the warp yarns. Another technique, far more preferable, is a modified form of endless weaving, which normally provides a continuous loop of fabric. In modified endless weaving, the weft, or filling, yarns are continuously woven back and forth across the loom, in each passage forming a loop on the edges of the fabric being woven. As the weft, or filling, yarn, which ultimately becomes the machine-direction (MD) yarn in the press fabric, is continuous, the seaming loops obtained in this manner are stronger than any that can be produced in a flat woven fabric.

While seamed press fabrics have now been successfully used for a number of years, it has proven to be difficult to use these seaming techniques in laminated press felts.

In one prior-art laminated press fabric, a standard two-layer base fabric with a seam of the on-machine-seamable type is used. On top of this two-layer base fabric, an endless base fabric of a different construction is placed. Alternatively, this additional base may be flat-woven and its edges butted over the seam area of the two-layer base fabric. The two base fabric layers are then laminated together by needling in a staple fiber batt. However, in order to open the laminated fabric for installation on a paper machine, one of the final processing steps is to cut through the needled batt, and the machine-direction yarns of the top base fabric layer, where the top base fabric layer is endless.

Because the cross-machine direction yarns of the top base fabric layer are not perfectly straight across the top of the laminated fabric, that is, exactly perpendicular to the seaming loops of the on-machine-seamable base fabric layer, for the full width of the fabric, some cross-machine direction yarns will be cut during this process step. As a consequence, there will be short machine-direction and cross-machine direction yarn ends or lengths in the top base fabric layer which may migrate into the seaming loop area of the on-machine-seamable base fabric layer. When the fabric is installed on the paper machine press, which requires the seaming loops to be meshed together, these short ends or yarn lengths can get caught in the seam area and cause difficulties in meshing the seaming loops. They also can block or obstruct the path taken by the pin or pintle used to hold the meshed seaming loops together to close the seam. This makes installation more difficult and time-consuming, and more expensive in terms of increased machine downtime and lost production.

One method used to avoid this problem is to remove some cross-machine direction yarns from the top base fabric layer prior to needling. These yarns are removed from the top base fabric layer in the region overlying the seaming loops in the bottom base fabric layer. While this eliminates the possibility of accidentally cutting through the cross-machine direction yarns and causing the problems discussed in the preceding paragraph, this gives the seam area a more pronounced mass and caliper difference under load relative to the rest of the fabric. This difference can lead to objectionable seam mark, and/or seam "bounce".

Another way to eliminate this problem is to make both base fabric layers of the on-machine-seamable type. Their seams can be aligned one on top of the other, or offset slightly relative to each other in a longitudinal direction, and both bases laminated together during the application of fibrous batt by needling. While this can be done with multi-layer bases, it is difficult to do with single-layer bases, which are difficult to provide with on-machine-seamable seams having the same openness and thickness under load as the rest of the fabric. In any case, each base fabric layer in the laminated press fabric would have to be separately closed. Not only is it physically difficult to seam separate, intimately joined base fabric layers in this manner, but the seam region so obtained is more susceptible to the thickness and permeability problems discussed above as it comprises more than one separate seam.

There is also the problem of base size matching, even with endless laminated fabrics. Any time two separate bases are woven, especially of different construction, chances are that base lengths at the point of lamination during needling will be different enough to require one of the bases to be additionally processed. This costs money and takes time. Often, one of the bases must be discarded and a new one made.

Accordingly, the provision of a readily on-machine-seamable, laminated press fabric, whose individual lamina are well-matched dimensionally and in appearance and quality, and whose seam may be readily closed on a papermachine, would fill a great need in the papermaking industry. The present invention, which will now be described in the passages to follow, is submitted to fill this need in the industry.

SUMMARY OF THE INVENTION

The present invention is a laminated, integrally woven on-machine-seamable papermaker's fabric and a method for manufacturing the papermaker's fabric.

The papermaker's fabric of the invention includes a first plurality of warp yarns and a second plurality of warp yarns interwoven with a continuous weft yarn by an endless weaving technique. That is to say, the continuous weft yarn alternately interweaves with the first plurality of warp yarns to produce a first woven ply, and with the second plurality of warp yarns to produce a second woven ply. The continuous weft yarn alternates between interweaving with the first plurality of warp yarns and with the second plurality of warp yarns at each of the two widthwise ends of the fabric. When so alternating, the continuous weft yarn forms one of a plurality of seaming loops for use in joining the fabric into endless form. It will be appreciated that the continuous weft yarn is the machine-direction (MD) yarn of the first and second woven plies when the papermaker's fabric is in its position of use on the papermachine. The papermaker's fabric is accordingly a laminated structure having two woven plies joined to one another by the plurality of seaming loops along the two widthwise ends.

The papermaker's fabric may be needled with a batt of staple fiber material, as is widely done in the industry. The needling drives the fibers into and through the two woven plies to further join them together.

The seaming loops, as noted above, are used to join the widthwise ends of the fabric to one another to place the fabric into the form of an endless loop. Alternatively, a monofilament seaming spiral may be attached to the seaming loops at each of the two widthwise ends of the papermaker's fabric either prior to or following the needling of the fabric with a batt of staple fibers. The monofilament seaming spirals are connected to the seaming loops by at least one connecting yarn. The coils of the spirals at the two ends of the fabric may then be interdigitated and joined to one another on the papermachine to form a seam usually referred to as a spiral seam.

During the weaving of the papermaker's fabric, a plurality of solvent-removable binder yarns is interwoven with at least one of the continuous weft yarn and said first and second pluralities of warp yarns to bind the two woven plies together. That is to say, the fabric may include a warp binder, a weft binder, or binders in both fabric directions.

The binder yarns are made of a material soluble in a particular solvent not affecting the functional woven base yarns, that is, the first and second pluralities of warp yarns and the continuous weft yarn. Once the fabric is woven, and before or after it is needled with a batt of staple fiber material, the binder yarns are removed through dissolution with the particular solvent to yield a laminated structure.

The present invention is also a method for manufacturing an on-machine-seamable papermaker's fabric comprising the steps of providing the above-mentioned yarns, and of weaving a two-ply fabric with a binder therefrom by an endless weaving technique wherein seaming loops are formed at the two widthwise ends thereof.

In the endless weaving process, the continuous weft yarn alternates between the first and second pluralities of warp yarns at the two widthwise ends of the fabric, at each alternation providing one of a plurality of seaming loops for joining the fabric into endless form.

Concurrently, the plurality of solvent-removable binder yarns is interwoven with at least one of the endless weft yarn and the first and second pluralities of warp yarns to bind the first and second plies together. Later, the solvent-removable warp and/or weft binder yarns are removed by dissolution with the particular solvent to yield a laminated on-machine-seamable papermaker's fabric comprising first and second plies joined to one another at the widthwise ends of the fabric by the seaming loops, which themselves are formed by the continuous weft yarn used to weave the plies.

While the present laminated on-machine-seamable papermaker's fabric is primarily intended for use as a press fabric, it may also find use as a forming or dryer fabric, or as a base for a resin polymer-coated, Paper-Industry Process Belt, such as a long nip press (LNP) belt, a sheet-transfer belt, or a calender belt.

The present invention will now be described in more complete detail with frequent reference being made to the figures identified as follows.

BRIEF DESCRIPTION OF THE DRAWINGS

FIG. 3 is a cross-sectional view taken as indicated by line 3—3 in FIG. 2;

FIG. 4 is a cross-sectional view, corresponding to that of FIG. 3, following the removal of a solvent-removable yarn;

FIG. 5 is a cross-sectional view taken as indicated by line 5—5 in FIG. 3;

FIG. 6 is a cross-sectional view taken as indicated by line 6—6 in FIG. 4;

FIG. 8 is a cross-sectional view of the seam of the OMS® press fabric of the present invention taken in the same manner as is indicated by line 7—7 in FIG. 1 following the removal of the solvent-removable binder yarns; and FIG. 9 is a cross-sectional view of an alternate embodiment of the seam taken in the same manner as is indicated by line 7—7 in FIG. 1.

DETAILED DESCRIPTION OF THE PREFERRED EMBODIMENT

Figure 1:
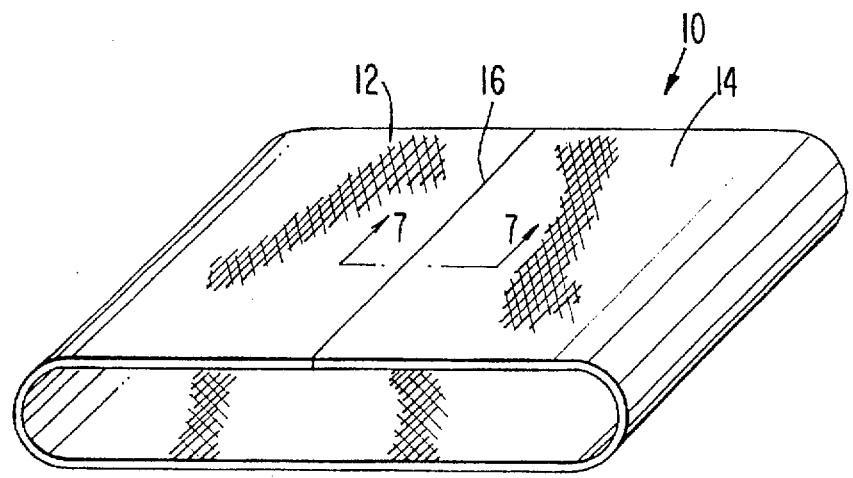
FIG. 1 is a schematic perspective view of an on-machine-seamable (OMS®) press fabric.

Turning now specifically to the figures, FIG. 1 is a schematic perspective view of an on-machine-seamable (OMS®) papermaker's fabric 10. The fabric 10 takes the form of an endless loop once its two ends 12, 14 have been joined to one another at seam 16.

Figure 2:
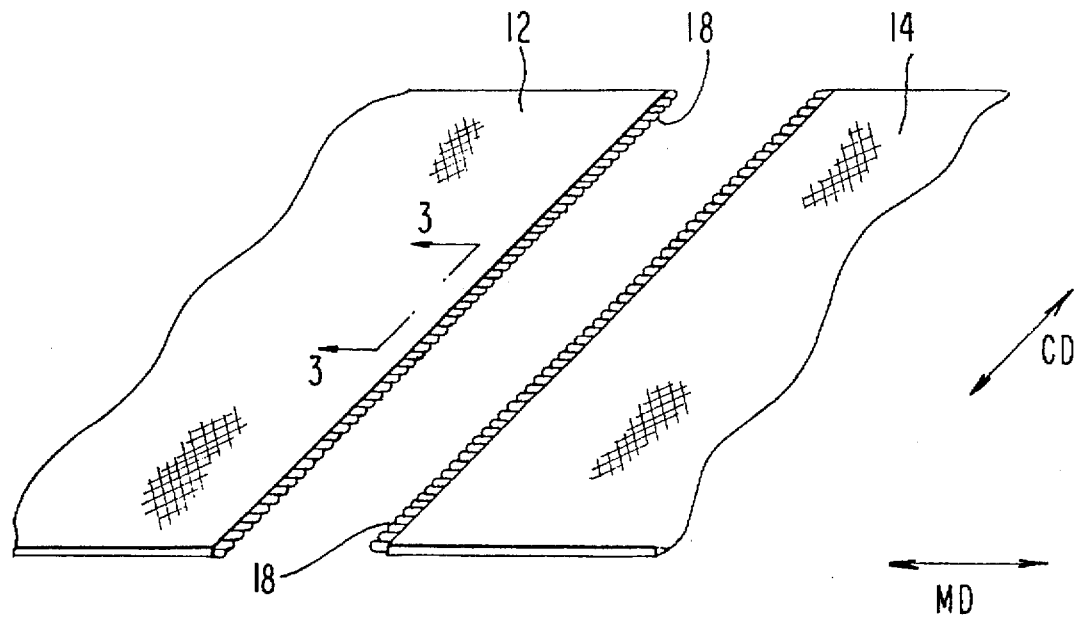
FIG. 2 is a schematic perspective view of the two ends of the OMS® press fabric prior to their being joined to one another.

FIG. 2 is a schematic perspective view of the two ends 12, 14 of the OMS® fabric 10 prior to their attachment to one another. Widthwise across the edges of each of the two ends 12, 14 are a plurality of seaming loops 18. To attach the two ends 12, 14 to one another, they are brought together, in so doing alternating and intermeshing, or interdigitating, the seaming loops 18 at each end with one another. The interdigitated seaming loops 18 define a passage through which a pin, or pintle, a yarn-like strand or member, may be directed to secure the ends 12, 14 to one another to form the seam.

Seaming loops 18 are formed by machine-direction (MD) yarns of the fabric 10, the machine direction being the direction of travel of the fabric 10 on a papermachine. In the weaving of the fabrics 10 of the present invention, the machine-direction (MD) yarns forming seaming loops 18 are continuous weft, or filling, yarns on the weaving loom. These weft yarns weave endlessly back and forth across the loom in a process known in the industry as modified endless weaving. At suitable intervals, they weave around an edge cord, forming a seaming loop 18 for ultimate use in seaming the fabric during installation on a paper machine.

Several schemes, disclosed and claimed in U.S. Pat. No. 3,815,645 to Codorniu, the teachings of which are incorporated herein by reference, for weaving OMS® fabrics by modified endless weaving are available and may be used in the practice of the present invention. In one scheme, an edge cord is disposed at one of the two edges of the weaving loom. The continuous weft yarns weave around the edge cord alternately forming seaming loops 18 for top and bottom cloths on the weaving loom. At the other edge of the weaving loom, the weft yarns take a continuous path from the top cloth to the bottom cloth, or vice versa, as in traditional endless weaving. As a consequence, the top and bottom cloths are connected by a series of continuous weft yarns at this latter edge of the weaving loom, while they are connected by two sets of seaming loops 18, one for the top cloth and the other for the bottom cloth, joined by the edge cord at the first edge of the weaving loom. Ultimately, the top and bottom cloths together form an endless loop of fabric which may be opened by removing the edge cord.

FIG. 3 is a cross-sectional view taken as indicated by line 3—3 in FIG. 2. The cross section is taken in the cross-machine direction (CD) and, as a consequence, MD yarns 20, 20', 22 are viewed in cross section while CD yarns 26, 28 are viewed from the side. It should be understood that in this and other figures the scale of and spacing between MD yarns 20, 20', 22 and CD yarns 26, 28 has been greatly exaggerated for the sake of clarity.

It will be recognized, bearing in mind that MD yarns 20, 20', 22 are weft, or filling, yarns, that the fabric 10 shown in FIG. 3 is a two-ply fabric with a weft binder. CD yarn 26, which is a warp yarn on the loom used to weave fabric 10, interweaves with MD yarns 20, 22 to form one of the two plies. CD yarn 28, on the other hand, interweaves with MD yarns 20', 22 to form the other of the two plies. It may also be described as a 2½-layer fabric. While a specific weave pattern is shown in FIG. 3, it should be understood that it is shown for the purposes of illustration alone, and that a two-ply fabric, of any weave pattern having a warp binder, a weft binder, or both kinds of binder, may be used to weave the fabric 10 of the present invention.

It should also be understood that MD yarns 20, 20', 22 and CD yarns 26, 28 may be of any of the yarn classifications conventionally used by those in the papermachine clothing industry to weave press fabrics. That is to say, any of MD yarns 20, 20', 22 and CD yarns 26, 28 may be monofilament, plied monofilament, multifilament, plied multifilament, spun, knitted monofilament, knitted multifilament, braided monofilament, braided multifilament, polyurethane-coated monofilament, plied monofilament or multifilament, bicomponent or any other type of yarn. MD yarn 22, or, in general, the yarn or yarns functioning as the binder holding the two plies together, must, however, be of a soluble material, such as SOLVRON® (polyvinyl alcohol) or calcium alginate, which are soluble in water. Alternatively, certain uncured polymeric resin materials are soluble in warm water and could be used for MD yarn 22. Uncured acrylics are an example of such materials. On the other hand, MD yarns 20, 20' and CD yarns 26, 28 may be of polyamide, polyester, polyaramids, polyetheretherketone (PEEK) and polyurethanes, or any other polymeric resin material from which textile yarns may be extruded or formed.

FIG. 4 is a cross-sectional view, corresponding to that provided in FIG. 3, of the fabric 10 following the removal, by dissolution using the appropriate solvent, of MD yarn 22. Following the removal of MD yarn 22 in this manner, the two plies 30, 32 are separated from one another. Ply 30 is a single-layer fabric formed by the interweaving of MD yarns 20 with CD yarns 26, while ply 32 is a single-layer fabric formed by the interweaving of MD yarns 20' with CD yarns 28.

FIG. 5 is a cross-sectional view of the fabric 10 taken as indicated by line 5—5 in FIG. 3. Shown in FIG. 5 is the seaming loop 18 formed at the end 12 thereof where MD yarn 20 turns back, by wrapping around an edge cord (not shown) during the weaving process, and becomes MD yarn 20'. It may now be more clearly understood that MD yarns 20, 20' are one and the same continuous weft yarn, weaving back and forth across the loom and forming a seaming loop 18 when passing around the edge cord at the loop-forming edge of the weaving loom.

On the other hand, MD yarn 22 need not be endlessly woven in the same manner as MD yarns 20, 20', but may be woven in a different pattern. In FIG. 5, MD yarn 22 is so shown having an end adjacent to seaming loop 18. There is no need to form such a seaming loop 18 with MD yarn 22, or to weave it in a modified endless manner, as MD yarn 22, being of a soluble material, is in any event to be removed by an appropriate solvent. In general, of course, that solvent is one which dissolves MD yarn 22 without dissolving any of MD yarns 20, 20' or CD yarns 26, 28.

FIG. 6 is a cross-sectional view of the fabric 10 taken as indicated by line 6—6 in FIG. 4, and corresponds to that provided in FIG. 5 following the removal, by dissolution using the appropriate solvent, of MD yarn 22.

Following the removal of MD yarn 22 in this manner, the two plies 30, 32 are joined to one another only at the seaming loops 18. As a consequence, a laminated fabric 10, comprising two single-layer plies 30, 32, each being woven from MD and CD yarns, and joinable into endless form by seaming loops 18, is the result.

Figure 7:
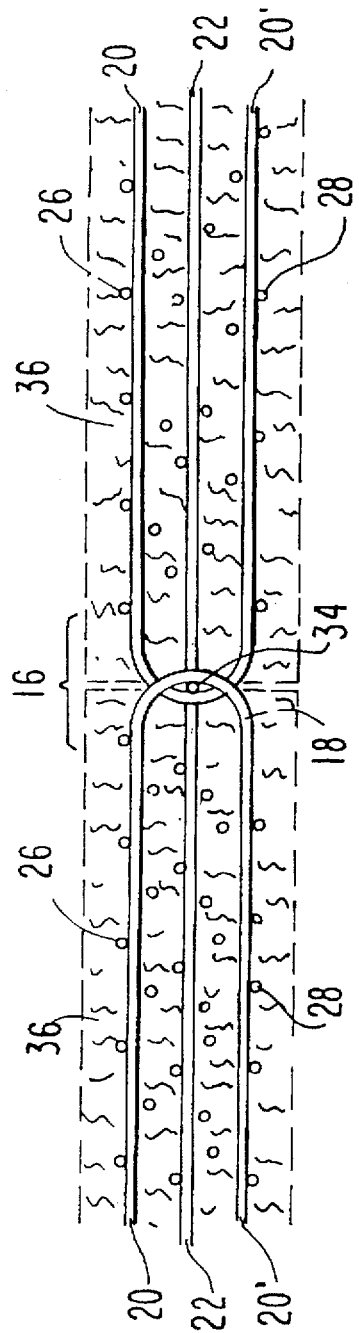
FIG. 7 is a cross-sectional view of the seam of the OMS® press fabric of the present invention taken as indicated by line 7—7 in FIG. 1.

FIG. 7 is a cross-sectional view of seam 16 taken as indicated by line 7—7 in FIG. 1 prior to the removal of MD yarn 22. Seaming loops 18 at ends 12, 14 are interdigitated with one another, as previously explained, and a pin, or pintle, 34 is directed through the passage defined by the interdigitated seaming loops 18 to join ends 12, 14 to one another. A batt 36 of staple fiber material is needled through the papermaker's fabric. The staple fibers may include fibers of polyamide, polyester, polyimide, polypropylene, polyolefin, polyethylene terephthalate (PET), polyetheretherketone (PEEK), polytetrafluoroethylene (PTFE), polyaramid, para-aramid or meta-aramid. Alternatively, or in addition to batt 36 of staple fibers, the papermaker's fabric may be impregnated with a polymeric resin material or a fiber-reinforced polymeric resin material.

FIG. 8 is a cross-sectional view of seam 16 taken in the same manner as is indicated by line 7—7 in FIG. 1 following the removal of solvent-removable MD yarn 22. Seaming loops 18 at ends 12, 14 are again interdigitated with one another and a pin, or pintle, 34 is directed through the passage defined by the interdigitated seaming loops 18 to join ends 12, 14 to one another. A batt 36 of staple fiber material is needled through plies 30, 32 to join them to one another. The batt 36 may include staple fibers of any of the materials noted above. Alternatively, or in addition to batt 36 of staple fibers, plies 30, 32 may be joined to one another by impregnating them with a polymeric resin material or a fiber-reinforced polymeric resin material.

Solvent-removable MD yarn 22 may be removed at any time subsequent to weaving, during the manufacturing process or after installation on the papermachine.

FIG. 9 is a cross-sectional view of an alternate embodiment seam 38 taken in the same manner as is indicated by line 7—7 in FIG. 1. In seam 38, seaming loops 18 are not interdigitated with one another. Rather, an extruded monofilament seaming spiral 40 is attached to each end 12, 14 by interdigitating the monofilament seaming spirals 40 with the seaming loops 18 at ends 12, 14, and by directing one or more connecting yarns 42 through the passages defined by the intersecting monofilament seaming spirals 40 and seaming loops 18. The seam 38 is then formed by interdigitating the individual coils of the seaming spirals 40, and by directing a pin, or pintle, 34 through the passage defined by the intersecting coils. A batt 36 of staple fibers of any of the polymeric materials noted above is needled through plies 30, 32 to join them to one another either before or after the monofilament seaming spirals 40 are attached to ends 12, 14.

As previously noted, the present papermaker's fabric may be used as a base for a polymer-coated, Paper-Industry Process Belt (PIPB), such as a long nip press (LNP) belt, a sheet-transfer belt, or a calender belt. In such a case, at least one side of the papermaker's fabric is coated with a polymeric resin material, such as polyurethane, after the soluble binder yarn is removed. Prior to the application of the coating, the papermaker's fabric may be needled with a batt of staple fiber material.

The present invention offers several advantages not afforded by the fabrics of the prior art. First, and foremost, a laminated OMS® fabric is produced in one operation on the loom with both lamina, or plies, being integrally woven. In the preferred embodiment, the fabric itself comprises two single-layer plies, which themselves would be difficult to seam, but which are jointly seamed because the seaming loops themselves are formed by a yarn serving as the MD yarn of both plies. Further, the two plies are perfectly matched in size, obviating the matching problems endemic to prior-art laminated press fabrics. The seam formed in the manner of the present invention has characteristics far more similar to the rest of the body of the laminated fabric than one resulting from separately seaming each single-layer ply, and is much less likely to mark the paper being manufactured. Finally, because the lamina are integrally woven, the CD yarn count in each ply can be less than would be required if they were separately woven. This ensures that each ply is lighter and more open, and that the laminated press fabric so obtained is not as heavy, dense or stiff as those of the prior art.

Clearly, modifications to the above would be obvious to those of ordinary skill in the art, but would not bring the invention so modified beyond the scope of the appended claims.

What is claimed is:

1. A laminated integrally woven on-machine-seamable papermaker's fabric, said fabric having a first end and a second end and a plurality of seaming loops at each of said first and second ends for use in joining said fabric into endless form with a pin seam, said fabric comprising:

a first plurality of warp yarns;

a second plurality of warp yarns; and a continuous weft yarn, wherein said continuous weft yarn interweaves with said first plurality of warp yarns to produce a first woven ply, and with said second plurality of warp yarns to produce a second woven ply, said continuous weft yarn alternating from interweaving with said first plurality of warp yarns to interweaving with said second plurality of warp yarns at said first end of said fabric, and from interweaving with said second plurality of warp yarns to interweaving with said first plurality of warp yarns at said second end of said fabric, when so alternating, forming one of said plurality of seaming loops at said first and second ends for joining said fabric into endless form, said fabric thereby being a laminated structure having two woven plies joined to one another by said plurality of seaming loops along said first and second ends.

2. A papermaker's fabric as claimed in claim 1 further comprising a batt of staple fiber material needled into and through said laminated structure and further attaching said two woven plies to one another.

3. A papermaker's fabric as claimed in claim 2 wherein said batt of staple fiber material includes staple fibers of a polymeric resin selected from the group consisting of polyamide, polyester, polyimide, polypropylene, polyolefin, polyethylene terephthalate (PET), polyetheretherketone (PEEK), polytetrafluoroethylene (PTFE), polyaramid, para-aramid and meta-aramid.

4. A papermaker's fabric as claimed in claim 1 further comprising a polymeric resin material impregnating said laminated structure and further attaching said two woven plies to one another.

5. A papermaker's fabric as claimed in claim 4 wherein said polymeric resin material is fiber-reinforced.

6. A papermaker's fabric as claimed in claim 1 further comprising a first and a second monofilament seaming spiral, said first seaming spiral being attached to said seaming loops at said first end of said fabric by at least one connecting yarn and said second seaming spiral being attached to said seaming loops at said second end of said fabric by at least one connecting yarn, said first and second seaming spirals each having a plurality of coils, those of said first seaming spiral being interdigitatable with those of said second seaming spiral.

7. A papermaker's fabric as claimed in claim 1 wherein said first plurality of warp yarns, said second plurality of warp yarns, and said continuous weft yarn are yarns of the types selected from the group consisting of monofilament, plied monofilament, multifilament, plied multifilament, spun, knitted monofilament, knitted multifilament, braided monofilament, braided multifilament, polyurethane-coated monofilament, plied monofilament and multifilament, and bicomponent yarns.

8. A papermaker's fabric as claimed in claim 1 wherein said first plurality of warp yarns, said second plurality of warp yarns, and said continuous weft yarn are yarns of the polymeric resin materials selected from the group consisting of polyamide, polyester, polyaramids, polyetheretherketone (PEEK) and polyurethanes.

9. A papermaker's fabric as claimed in claim 1 further comprising a coating of a polymeric resin material on at least one side thereof, so that said papermaker's fabric may be a polymer-coated, paper-industry process belt.

10. A papermaker's fabric as claimed in claim 2 further comprising a coating of a polymeric resin material on at least one side thereof, so that said papermaker's fabric may be a polymer-coated, paper-industry process belt.

11. An intermediate on-machine-seamable papermaker's fabric product, said intermediate fabric product having two ends and a plurality of seaming loops at each of said two ends for use in joining said fabric into endless form, said intermediate fabric product comprising:

a first plurality of warp yarns;

a second plurality of warp yarns;

a continuous weft yarn; and a plurality of solvent-removable binder yarns, said binder yarns being soluble in a particular solvent not affecting said first and second pluralities of warp yarns and said continuous weft yarn, wherein said continuous weft yarn alternately interweaves with said first plurality of warp yarns to produce a first woven ply, and with said second plurality of warp yarns to produce a second woven ply, said continuous weft yarn alternating between interweaving with said first plurality of warp yarns and with said second plurality of warp yarns at each of said two ends of said intermediate fabric product, when so alternating, forming one of said plurality of seaming loops for joining said intermediate fabric product into endless form, and wherein said plurality of solvent-removable binder yarns interweaves with at least one of said continuous weft yarn and said first and second pluralities of warp yarns to bind said first and second plies together.

12. A papermaker's fabric product as claimed in claim 11 wherein said plurality of solvent-removable binder yarns is a plurality of warp binder yarns.

13. A papermaker's fabric product as claimed in claim 11 wherein said plurality of solvent-removable binder yarns is a plurality of weft binder yarns.

14. A papermaker's fabric product as claimed in claim 11 wherein said plurality of solvent-removable binder yarns is both a plurality of warp binder yarns and a plurality of weft binder yarns.

15. A papermaker's fabric product as claimed in claim 11 wherein said plurality of solvent-removable binder yarns is of a material selected from the group consisting of polyvinyl alcohol, calcium alginate and uncured acrylic, and wherein said particular solvent is water.

16. A papermaker's fabric product as claimed in claim 11 further comprising a batt of staple fiber material needled into and through said first and second woven plies.

17. A papermaker's fabric product as claimed in claim 16 wherein said batt of staple fiber material includes staple fibers of a polymeric resin selected from the group consisting of polyamide, polyester, polyimide, polypropylene, polyolefin, polyethylene terephthalate (PET), polyetheretherketone (PEEK), polytetrafluoroethylene (PTFE), polyaramid, para-aramid and meta-aramid.

18. A papermaker's fabric product as claimed in claim 11 further comprising a polymeric resin material impregnating said first and second woven plies.

19. A papermaker's fabric product as claimed in claim 18 wherein said polymeric resin material is fiber-reinforced.

20. A papermaker's fabric product as claimed in claim 11 further comprising a first and a second monofilament seaming spiral, said first seaming spiral being attached to said seaming loops at one of said ends of said fabric by at least one connecting yarn and said second seaming spiral being attached to said seaming loops at the other of said ends of said fabric by at least one connecting yarn, said first and second seaming spirals each having a plurality of coils, those of said first seaming spiral being interdigitatable with those of said second seaming spiral.

21. A papermaker's fabric product as claimed in claim 11 wherein said first plurality of warp yarns, said second plurality of warp yarns, and said continuous weft yarn are yarns of the types selected from the group consisting of monofilament, plied monofilament, multifilament, plied multifilament, spun, knitted monofilament, knitted multifilament, braided monofilament, braided multifilament, polyurethane-coated monofilament, plied monofilament and multifilament, and bicomponent yarns.

22. A papermaker's fabric product as claimed in claim 11 wherein said first plurality of warp yarns, said second plurality of warp yarns, and said continuous weft yarn are yarns of the polymeric resin materials selected from the group consisting of polyamide, polyester, polyaramids, polyetheretherketone (PEEK) and polyurethanes.

23. A papermaker's fabric product as claimed in claim 11 further comprising a coating of a polymeric resin material on at least one side thereof, so that said fabric product may be a polymer-coated, paper-industry process belt.

24. A papermaker's fabric product as claimed in claim 16 further comprising a coating of a polymeric resin material on at least one side thereof, so that said fabric product may be a polymer-coated, paper-industry process belt.

25. A method for manufacturing a laminated integrally woven on-machine-seamable papermaker's fabric comprising the steps of:

providing a first plurality of warp yarns, a second plurality of warp yarns, a continuous weft yarn, and a plurality of solvent-removable binder yarns, said binder yarns being soluble in a particular solvent not affecting said first and second pluralities of warp yarns and said continuous weft yarn;

weaving a two-ply fabric from said yarns by an endless weaving technique, wherein said two-ply fabric has two ends and wherein seaming loops are formed at said two ends by weaving said continuous weft yarn around an edge cord, said weft yarn alternatingly interweaving with said first plurality of warp yarns and with said second plurality of warp yarns following each alternate passage around said edge cord to provide a first ply and a second ply, respectively, while interweaving said plurality of solvent-removable binder yarns with at least one of said continuous weft yarn and said first and second pluralities of warp yarns to bind said first and second plies together.

26. A method as claimed in claim 25 wherein said plurality of solvent-removable binder yarns is a plurality of warp binder yarns, and wherein said plurality of warp binder yarns interweaves with said continuous weft yarn.

27. A method as claimed in claim 25 wherein said plurality of solvent-removable binder yarns is a plurality of weft binder yarns, and wherein said plurality of weft binder yarns interweaves with said first and second pluralities of warp yarns.

28. A method as claimed in claim 25 wherein said plurality of solvent-removable binder yarns is both a plurality of warp binder yarns and a plurality of weft binder yarns, and wherein said plurality of warp binder yarns interweaves with said continuous weft yarn and said plurality of weft binder yarns interweaves with said first and second pluralities of warp yarns.

29. A method as claimed in claim 25 further comprising the step of:

removing said plurality of solvent-removable binder yarns through dissolution with said particular solvent, whereby a laminated on-machine-seamable papermaker's fabric comprising said first ply and said second ply joined to one another at said seaming loops is obtained.

30. A method as claimed in claim 25 wherein said plurality of solvent-removable binder yarns is of a material selected from the group consisting of polyvinyl alcohol, calcium alginate and uncured acrylic, and wherein said particular solvent is water.

31. A method as claimed in claim 25 further comprising the step of:

needling a batt of staple fiber material into and through said first ply and said second ply.

32. A method as claimed in claim 25 further comprising the steps of:

providing a first and a second monofilament seaming spiral;

removing said edge cord to separate said two ends of said two-ply fabric from one another;

connecting said first monofilament seaming spiral to said seaming loops at one of said two ends of said two-ply fabric by interdigitating said first monofilament seaming spiral with said seaming loops and by directing at least one connecting yarn through a passage defined thereby; and connecting said second monofilament seaming spiral to said seaming loops at the other of said two ends of said two-ply fabric by interdigitating said second monofilament seaming spiral with said seaming loops and by directing at least one connecting yarn through a passage defined thereby.

* * * * *